United States Patent
Kaminow et al.

[11] 3,871,742
[45] Mar. 18, 1975

[54] COMPOSITE THIN FILM OPTICAL DEVICE

[75] Inventors: Ivan Paul Kaminow, New Shrewbury; Herwig Werner Kogelnik, Fair Haven, both of N.J.

[73] Assignee: Bell Telephone Laboratories, Incorporated, Murray Hill, Berkeley Heights, N.J.

[22] Filed: Oct. 18, 1973

[21] Appl. No.: 407,522

[52] U.S. Cl. ...... 350/96 WG, 350/96 C, 350/160 R
[51] Int. Cl. ............................................. G02b 5/14
[58] Field of Search ................... 350/96 WG, 96 C

[56] References Cited
UNITED STATES PATENTS

| | | | |
|---|---|---|---|
| 3,674,335 | 7/1972 | Ashkin et al. | 350/96 WG |
| 3,753,157 | 8/1973 | Ash et al. | 350/96 WG X |
| 3,760,297 | 9/1973 | Thompson | 350/96 WG X |
| 3,791,715 | 2/1974 | Lean et al. | 350/96 WG |

*Primary Examiner*—John K. Corbin
*Attorney, Agent, or Firm*—L. C. Canepa

[57] ABSTRACT

The unclad faces of the substrates of two integrated-optics devices are butted together to form a composite structure having waveguiding layers on spaced-apart opposed surfaces. Diffraction gratings respectively associated with the layers are effective to cause a wave propagating in one layer to be diverted through the substrates and coupled to the other layer for propagation therein. If, for example, the first layer comprises an element of a laser and the other layer comprises an element of a modulator, both wave generation and modulation can be thereby carried out in a compact structure in an efficient way.

9 Claims, 2 Drawing Figures

3,871,742

1

COMPOSITE THIN FILM OPTICAL DEVICE

BACKGROUND OF THE INVENTION

This invention relates to optical signal processing and, more particularly, to a composite optical waveguiding structure in which several basic functions may be performed.

Integrated optics is a recently developed technology in which thin-film techniques are applied to the fabrication of miniature compact optical devices. Due to their small size, rugged and reproducible construction and low cost, such devices are attractive candidates for inclusion in high-capacity optical communication systems.

For an overview of the field of integrated optics see, for example, a "Survey of Integrated Optics" by S. E. Miller, *IEEE Journal of Quantum Electronics*, Vol. QE–8, No. 2, Feb. 1972, pages 199–205.

Ideally, one would like to be able to perform multiple basic functions in a single optical waveguiding thin film of an integrated-optics structure. In a truly integrated device, various operations would be performed in essentially the same thin film.

Work is under way directed at the goal of achieving an integrated optical device in which multiple functions can be realized in a single thin film. Meanwhile, however, in practice it is desired to be able to combine available dissimilar thin-film devices in as compact and efficient a manner as possible. Thus, for example, in some applications of practical interest it is desired to combine a structure that includes a wave generating layer of Nd:YAG with a modulating structure comprising a film of LiNbO$_3$. No advantageous way of achieving such a combination in a compact and efficient manner has heretofore been suggested.

SUMMARY OF THE INVENTION

An object of the present invention is an improved thin-film optical device.

More specifically, an object of this invention is a composite optical waveguiding structure in which several basic functions are performed.

Briefly, these and other objects of the invention are realized in a specific illustrative embodiment thereof in which the unclad faces of the substrates of two-thin film devices are butted together to form a composite structure having waveguiding layers on opposed spaced-apart surfaces.

A grating formed on one of the layers is effective to direct an optical wave propagating in that layer into the butted-together substrates. In turn, another grating formed on the other layer in the path of the diverted wave is effective to couple the wave into the other layer for propagation therein. The first-mentioned layer may be, for example, a component of a thin-film laser, whereas the second-mentioned layer may be an element of a modulator. In such an illustrative embodiment, both wave generation and modulation can thus be carried out in a compact composite structure.

BRIEF DESCRIPTION OF THE DRAWING

A complete understanding of the present invention and of the above and other objects thereof may be gained from a consideration of the following detailed description presented hereinbelow in connection with the accompanying drawing in which:

2

Figure 1:
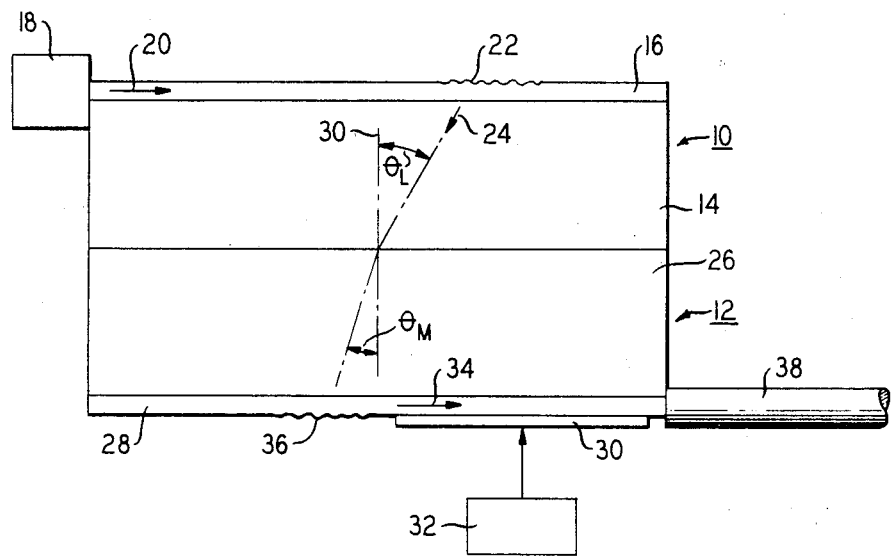
Figure 2:
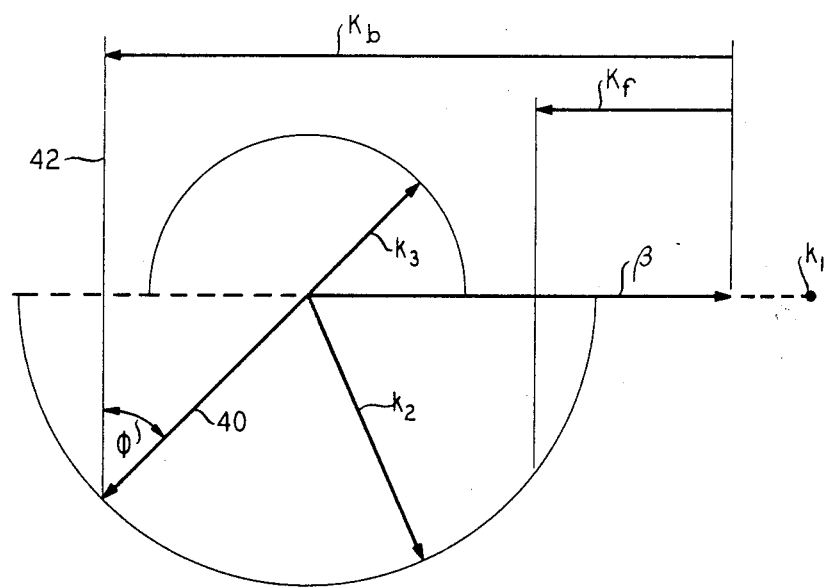

FIG. 1 shows a side view of a specific illustrative embodiment made in accordance with the principles of this invention; and FIG. 2 is a so-called *k*-vector diagram helpful in explaining the design and mode of operation of the FIG. 1 embodiment.

DETAILED DESCRIPTION

The structure shown in the drawing comprises two integrated-optics devices combined in a unique way. Illustratively, the upper one of the devices is a thin-film laser 10 and the lower device is a thin-film modulator 12.

The laser 10, which is for example, of the type described by J. P. Vander Ziel et al. in *Applied Physics Letters*, 22, 656 (1973), comprises a substrate 14 of YAG on which is deposited a thin layer 16 (approximately 2 μm thick) of Nd:YAG whose index of refraction is slightly higher than that of the substrate. Optical waves having a wavelength of 1.06 μm are excited in the laser 10 for propagation in the layer 16. Such excitation occurs in response to directing pump energy into the layer 16 from, for example, a conventional solid state radiation source 18, such as a laser diode. Waves so excited propagate in the layer 16 in the direction of arrow 20 until they are diffracted downward and backward (to the left) by a diffraction grating 22. The propagation path of these reflected waves is indicated in FIG. 1 by dashed lines including an arrow 24.

The grating 22 (as well as a grating 36 to be described later below) may take any form that presents a periodic or near-periodic perturbation or discontinuity to optical waves propagating in the thin film 16. For instance, the depicted grating may comprise dielectric photoresist lines, engraved grooves in the film 16, or even metal stripes deposited on the film. Alternatively, the thickness of the film 16 may be spatially varied along the direction of propagation of optical waves in the device 10. Or the grating 22 may be formed by depositing a dielectric material of varying thickness over the film 16 to load the film in a periodically perturbing fashion. Or the film itself may be selectively etched or ion milled to provide the desired perturbing profile.

Regardless of the technique utilized to form the grating 22, it may be considered to be a series of spaced-apart physically fixed discontinuities in the waveguiding medium 16. Adjacent discontinuities in the grating 22 are spaced apart a distance $\Lambda_L$ which hereinafter will be referred to as the period or spacing of the element 22 included in the laser 10.

The lower device 12 shown in the drawing also includes a substrate and a thin-film layer deposited thereon. Illustratively, these elements comprise a LiNbO$_3$ substrate 26 having an optical waveguiding layer 28 formed thereon by out-diffusion. The selective out-diffusion of Li$_2$O in a substrate of LiNbO$_3$ or LiTaO$_3$ to form a surface guiding layer is disclosed in J. R. Carruthers-I. P. Kaminow application Ser. No. 324,884, filed Jan. 18, 1973, now U.S. Pat. No. 3,837,827. Alternatively, a waveguiding layer may be formed on the substrate 26 by epitaxially depositing a higher-index layer thereon.

For purposes of a particular illustrative example, the device 12 is assumed to be a modulator. Specifically, the device 12 is assumed to comprise an electrically controlled optical intensity modulator of the type disclosed in I. P. Kaminow-H. W. Kogelnik application Ser. No. 345,715, filed Mar. 28, 1973. Accordingly, the device 12 includes longitudinally extending electrodes 30 deposited on the waveguiding layer 28. Electrical signals applied to the electrodes 30 by a modulating source 32 are effective to control the intensity of optical signals propagating from left to right in the layer 28 in the direction of arrow 34. In turn, optical signals so modulated are coupled from the layer 28 to a suitable output utilization device. As schematically represented in the drawing, the output device may, for example, comprise an optical fiber 38 having its input end butted against the device 12. Modulated optical signals delivered to the input end of the fiber 38 may be transmitted to a distant receiving point (not shown) included in an optical communication system.

In accordance with the principles of the present invention, the substrates 14 and 26 of the respective devices shown in the drawing are butted together. Advantageously, the surfaces to be joined are ground flat before the substrates are positioned in the depicted contacting relationship. A cement having an index of refraction matching that of either one of the substrates 14 and 26 may be utilized on all or a portion of the contacting surfaces to secure the devices together to form a permanently bonded composite structure.

As described above, optical waves propagating in the thin film 16 of the upper device 10 are reflected into the substrate 14 by a grating 22. In the substrate 14 the propagation vector 24 of these waves makes an angle $\theta_L$ with a line 30 that is perpendicular to the plane of the interface between the contacting substrates 14 and 26. In the substrate 26 the propagation vector of these waves makes an angle $\theta_M$ with the line 30. After traversing the substrate 26 these waves impinge upon a diffraction grating 36 associated with the thin layer 28. In turn, the grating 36 (whose period or spacing will be referred to below as $\Lambda_M$) is effective to couple a major portion of the incident energy into the waveguiding layer 28 to propagate therein in the direction of the arrow 34. (The use of a reflection grating to couple optical waves from the substrate to the waveguiding thin film of an integrated-optics device is described in detail in A. Ashkin-E. P. Ippen U.S. Pat. No. 3,674,335, issued July 4, 1972.) Subsequently, as described above, optical signals coupled to the layer 28 are modulated and then delivered to an appropriate output utilization device.

In accordance with the principles of this invention, TE modes will experience some reflection at the interface but the reflection of TM-mode waves at the interface of the substrates 14 and 26 may be minimized. This is done by insuring that $\theta_L$ and $\theta_M$ are equal to the appropriate so-called Brewster angle. At the Brewster angle the following relationships hold:

$$\tan \theta_L = n_M/n_L \qquad (1)$$

$$\tan \theta_M = n_L/n_M \qquad (2)$$

where $n_L$ and $n_M$ are the indices of refraction of the substrates 14 and 26, respectively. Then, $\theta_L + \theta_M = \pi/2$. In the illustrative embodiment shown in FIG. 1, $\theta_L$ is established equal to the Brewster angle by appropriate selection of the grating spacing $\Lambda_L$ of the element 22.

The $k$-vector diagram of FIG. 2 is a useful aid in determining the appropriate value for $\Lambda_L$.

In FIG. 2, $k_1$, $k_2$, and $k_3$ are the respective wave numbers of the integrated-optics device having a waveguiding thin film, a substrate, and a medium serving as a superstrate covering the film. Illustratively, the superstrate comprises air, with an index of refraction equal to 1. As indicated in the diagram, $$k_1 > k_2 > k_3. \qquad (3)$$

$\beta$ is the propagation constant of a wave propagating in the unperturbed thin film:

$$\beta = 2\pi n/\lambda \qquad (4)$$

where $n$ is the effective index of refraction of the waveguide and $\lambda$ is the free-space wavelength of the wave propagated therein.

The generalized $k$-diagram shown in FIG. 2 also represents the effect of interposing a reflection grating in the path of the wave propagating in the thin film of an integrated-optics device. Diffraction from such a grating into the substrate of the device can occur either in a forward direction (downward and to the right in the substrate 14 of FIG. 1) or in a backward direction (as illustrated by the vector 24 of FIG. 1). The wave propagation constants attributable to such a grating for the forward- and backward-reflection cases are $K_f$ and $K_b$, respectively, as represented in FIG. 2. Diffraction from the grating into the substrate, but not into the superstrate, is assured if $$k_2 > \beta|-K| > k_3 \qquad (5)$$

where $K = 2\pi/\Lambda$ with $\Lambda$ being the period of the assumed grating.

To suppress grating orders that are not desired, it is advantageous to limit reflection from the grating to the backward case (which is represented by the dashed-line propagation path shown in FIG. 1). In that case $$k_2 > (K_b - \beta) > k_3 \qquad (6)$$

and the direction of the backward-reflected radiation in the substrate is represented by vector 40 of FIG. 2. This vector makes an angle $\phi$ with perpendicular reference line 42. It is apparent that $$\tan \phi = K - \beta / \sqrt{k_2^2 - (K - \beta)^2} \qquad (7)$$

where the K's employed hereinafter are assumed to correspond the the backward-reflection case only.

To satisfy the aforementioned Brewster-angle condition, $\phi$ of FIG. 2 must equal $\theta_L$ of FIG. 1. Hence, for the particular illustrative device 10 of FIG. 1

$$\tan \theta_L = (K_L - \beta_L)/ \sqrt{k_2^2 - (K_L - \beta_L)^2} = n_m/n_L = N_l / \sqrt{n_L^2 - N_L^2} \qquad (8)$$

where $$(K_L - \beta_L) = 2\pi/\lambda \, N_L.$$

Then, $$N_L^2 = n_L^2 \, n_M^2/n_L^2 + n_M^2 . \qquad (9)$$

Similarly, for $\theta_M$ of the device 12 of FIG. 1, $$N_M{}^2 = n_L{}^2\ n_M{}^{2}/n_L{}^2 + n_M{}^2 = N_L{}^2 \qquad (10)$$

where $(K_M - \beta_M) = 2\pi/\lambda N_M$.

For given values of $\beta_L$ and $\beta_M$, formulas (9) and (10) define the periods of the gratings 22 and 36, respectively. From (6) it is apparent that we require $$n_L > N_L > n_3, \qquad (11)$$

$$n_M > N_M > n_3$$

where $n_3$ is the index of refraction of the medium above the layer 16 and below the layer 28 of FIG. 1. Illustratively, this medium is air. Hence, $n_3 = 1$. From (9) and (10) it is clear that $N_L = N_M = N$ is always less then $n_L$ and $n_M$. To satisfy the lower limit we require $$N^2 = n_L{}^2\ n_M{}^{2}/n_L{}^2 + n_M{}^2 > n_3{}^2\ (=1). \qquad (12)$$

Consider coupling a Nd:YAG laser and a LiNbO$_3$ modulator, as illustratively depicted in FIG. 1. For that particular example, $n_L = 1.82$, $n_L{}^2 = 3.31$, $n_M = 2.21$, $n_M{}^2 = 4.88$, $N^2 = 1.97$, and $N = 1.40$. For
$\beta_L \cong n_L\ 2\pi/\lambda$ and $\beta_M \cong n_M\ 2\pi/\lambda$, $$K_L = 2\pi/\lambda\ (N + n_L) \qquad (13)$$

and $$K_M = 2\pi/\lambda\ (N + n_M). \qquad (14)$$

If
$\lambda = 1.06\mu$, $\Lambda_L = \lambda/N + n_L = 0.32\mu$, $\Lambda_M = 0.29\mu$.
$\theta_L = 50.5°$ and $\theta_M = 39.5°$.

It is to be understood that the specific butted-together structure shown in FIG. 1 and described herein is only a particular illustrative embodiment of the application of the principles of the present invention. In accordance with these principles, numerous other structures may be devised by those skilled in the art without departing from the spirit and scope of the invention. For example, a variety of known couplers other than the particular afore-described grating couplers may be included in embodiments of this invention. Illustratively, such other couplers may comprise taper couplers of the type described in P. K. Tien Pat. 3,617,109, issued Nov. 2, 1971, or mode couplers of the type described in a copending application of H. W. Kogelnik and T. P. Sosnowski, Ser. No. 298,785, filed Oct. 18, 1972, now U.S. Pat. No. 3,797,911 issued Mar. 9, 1974.

Moreover, although emphasis above was directed to utilizing fixed couplers of the grating type in illustrative embodiments of the present invention, it is apparent that in some applications the couplers may advantageously be of the induced type. In that way the capability of selectively switching a propagating beam between various layers of a composite structure is provided. Thus, for example, a grating may be induced in the electro-optic material of such a composite structure by means of an interdigital electrode configuration of the type described in T. Li-R. D. Standley application Ser. No. 312,682, filed Dec. 6, 1972, now Patent 3,804,489 issued April 16, 1974. Alternatively, gratings can be induced in the waveguiding films of an embodiment made in accordance with the principles of the present invention by known acousto-optic or magneto-optic techniques.

Further, it is noted that the principles of the invention also encompass within their scope composite structures in which an intermediate substrate is interposed between thin-film devices. In such an alternative arrangement, one or more thin-film devices are mounted on each of two opposed faces of the intermediate or common substrate. In that case coupling among the various devices is carried out by directing waves from substrate to substrate of the respective mounted devices via the intermediate substrate.

What is claimed is:

1. A device comprising substrate means having wave propagating layers on spaced-apart surfaces thereof, means interposed in the path of waves propagated in one of said layers for directing said waves through said substrate means to impinge upon said other layer, and means associated with said other layer and interposed in the path of said directed waves for causing said directed waves to propagate in said other layer, wherein said substrate means comprises two distinct substrate members butted together, each of said members having an optical waveguiding thin film thereon.

2. A device as in claim 1 wherein each of said means for directing and means for causing comprises a diffraction grating.

3. A device as in claim 2 wherein said means for directing is proportioned to reflect waves propagated in the forward direction in said one layer through said substrate members in the backward direction at the Brewster angle.

4. A device as in claim 3 further comprising a pump source coupled to said one film for inducing optical wave generation therein.

5. A device as in claim 4 further including means for modulating waves propagated in the other one of said films.

6. A device as in claim 5 further including an output utilization device coupled to said other film for receiving modulated optical waves therefrom.

7. A composite integrated optical device comprising: first and second waveguiding structures each including a substrate having a waveguiding thin film thereon, said substrates being butted together to form a composite structure having said films on opposed surfaces of the composite structure, one of said films including means interposed in the path of a wave propagating in said one film for directing said wave through said substrates to the other one of said films, and means associated with said other film and interposed in the path of a wave so directed for causing said wave to propagate in said other film.

8. A device as in claim 7 wherein said first-mentioned means comprises a diffraction grating adapted to reflect a wave propagating in said one film toward the interface between said butted-together substrates, said grating being proportioned to reflect said wave through said substrates in the backward direction at the Brewster angle.

9. A device as in claim 8 wherein said second-mentioned means comprises a diffraction grating.

* * * * *